(12) United States Patent
Morris et al.

(10) Patent No.: US 7,178,017 B2
(45) Date of Patent: *Feb. 13, 2007

(54) NETWORK INTERFACE SHARING METHODS AND APPARATUSES THAT SUPPORT KERNEL MODE DATA TRAFFIC AND USER MODE DATA TRAFFIC

(75) Inventors: Larry Morris, Kirkland, WA (US); Glenn Davis, Woodinville, WA (US); Soemin Tjong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/261,286

(22) Filed: Oct. 28, 2005

(65) Prior Publication Data

US 2006/0129790 A1 Jun. 15, 2006

Related U.S. Application Data

(63) Continuation of application No. 10/021,592, filed on Oct. 30, 2001, now Pat. No. 7,007,157.

(51) Int. Cl.
*G06F 12/00* (2006.01)
(52) U.S. Cl. .................. 713/1; 324/763; 324/765; 714/30; 714/42; 714/724; 711/118; 711/123
(58) Field of Classification Search ................ 713/1; 324/763, 765; 714/30, 42, 72; 711/118, 711/123
See application file for complete search history.

(56) References Cited

U.S. PATENT DOCUMENTS 4,575,792 A   3/1986   Keeley
5,249,281 A   9/1993   Fuccio et al.

(Continued)

*Primary Examiner*—A. Elamin
(74) *Attorney, Agent, or Firm*—Lee & Hayes, PLLC

(57) ABSTRACT

Methods and apparatuses are provided that allow kernel mode data traffic and user mode data traffic to share a common network communication port. One apparatus includes user mode logic, kernel mode logic, and kernel mode to user mode interface logic. The interface logic is configured to receive data packets and selectively distribute the data packet to either the user mode or kernel mode logic. The interface logic includes "virtual" bridge logic and "virtual" miniport logic. The bridge logic determines if a received data packet is a user mode or kernel mode data packet. If it is a kernel mode data packet, then the bridge logic provides the data packet to the kernel mode logic. If it is a user mode data packet, then the bridge logic stores the data packet in memory for subsequent use by the user mode logic. The bridge logic also receives outgoing kernel mode data packets from the kernel mode logic and provides them to a network communication port, and retrieves outgoing user mode data packets from memory and provides them to the same network communication port. The miniport logic provides an interface between the memory accessed by the bridge logic and user mode logic. The miniport logic accepts outgoing user mode data packets and stores them in the memory for subsequent access by the bridge logic, and retrieves incoming user mode data packets stored in memory by the bridge logic.

3 Claims, 4 Drawing Sheets

U.S. PATENT DOCUMENTS

| | | |
|---|---|---|
| 5,530,804 A | 6/1996 | Edgington et al. |
| 5,781,721 A | 7/1998 | Hayes et al. |
| 6,041,427 A | 3/2000 | Levy |
| 6,052,806 A | 4/2000 | Beat |
| 6,067,407 A | 5/2000 | Wadsworth et al. |
| 6,067,638 A | 5/2000 | Benitz et al. |
| 6,185,703 B1 | 2/2001 | Guddat et al. |
| 6,304,988 B1 | 10/2001 | Levy |
| 6,415,393 B2 | 7/2002 | Satoh |
| 6,446,164 B1 | 9/2002 | Nguyen et al. |
| 6,553,506 B1 | 4/2003 | Hijikata et al. |
| 6,732,234 B1 | 5/2004 | Rowlands et al. |
| 6,760,834 B2 | 7/2004 | Roche et al. |
| 6,823,282 B1 | 11/2004 | Snyder |
| 6,868,510 B1 | 3/2005 | Nozu |
| 6,918,058 B2 | 7/2005 | Miura et al. |
| 2004/0073780 A1 | 4/2004 | Roth et al. |
| 2004/0153802 A1 | 8/2004 | Kudo et al. |

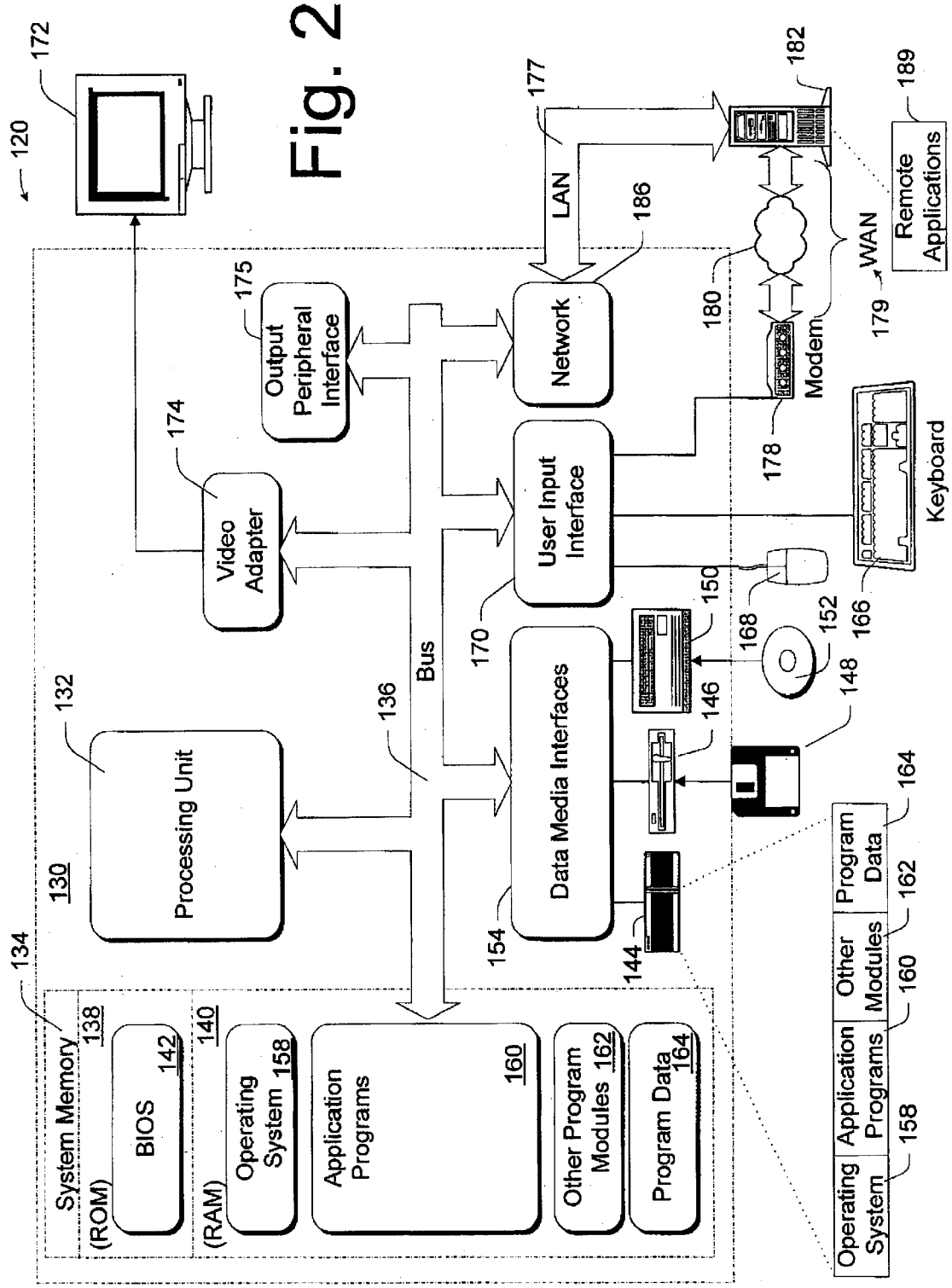

NETWORK INTERFACE SHARING METHODS AND APPARATUSES THAT SUPPORT KERNEL MODE DATA TRAFFIC AND USER MODE DATA TRAFFIC

RELATED APPLICATIONS

This application claims priority under 35 U.S.C. §120 as a continuation of U.S. patent application Ser. No. 10/021,592, filed Oct. 30, 2001, now U.S. Pat. No. 7,007,157, and titled "Network Interface Sharing Methods and Apparatuses that Support Kernel Mode Data Traffic and User Mode Data Traffic", the entire disclosure of which is hereby incorporated by reference in its entirety.

TECHNICAL FIELD

The present invention relates generally to data communications, and more particularly to improved methods and apparatuses that can be implemented in various communicating devices to support the transmission and reception of both kernel mode data and application level (user mode) data via a shared network interface.

BACKGROUND

A data communication environment typically includes at least two devices that are operatively coupled together through at least one network connection. By way of example, a device may include a computer and/or communicating device, and the network may include a packet switched network or the like. The device would usually include a processor that is configured to run programs (logic) including, for example, an operating system and one or more applications, etc. The processor may be considered to be running in either a kernel mode or a user mode, depending on the program(s) actively running at a given moment.

One common form of kernel mode logic is a debugging program that provides a tool for understanding how the processor and programmed logic are functioning. Such debugging often occurs during the manufacture of the device and/or programming of the device. To better understand how the device is performing, there may be a need to monitor the operation of the device at various times during which it is running in user mode. For example, it may be beneficial to periodically monitor various parameters associated with the device as it is communicates or attempts to communicate with another process or device.

In certain instances, this and other similar types of debugging may require the communication of both user mode data packets and kernel mode data packets. For devices configured with at least two physical network communication ports, this does not present a problem since one port can be configured to support the user mode related communications and another port can be configured to support the kernel mode related communications. However, there are some devices that are configured with only one physical network communication port. For example, certain World Wide Web accessing devices or appliances are configured with a single Ethernet (IEEE 802.3) or like communication port in order to reduce costs, size and/or complexity.

Typically, if a manufacture of such a device wanted to conduct debugging or other like testing, then a conventional serial or parallel data communication interface would be added/used. This may increase the cost, size and/or complexity of some devices. Such serial or parallel communication ports tend to be significantly slower than a network communication port, which may hamper the testing process. Moreover, the device may not be able to be tested in this manner once the end user has installed it, because the network communication port will likely be the only operative communication port. If testing is allowed, then the normal use of the device may be interrupted while the testing is conducted.

Consequently, there is a need for methods and apparatuses that allow kernel mode data traffic, such as, for example, debugging data packets, and user mode data traffic to share a common network communication port.

SUMMARY

Methods and apparatuses are provided that allow kernel mode data traffic and user mode data traffic to share a common network communication port.

In accordance with certain implementations of the present invention, for example, the above stated needs and others are met by an apparatus having user mode logic, kernel mode logic, and kernel mode to user mode interface logic. The interface logic is configured to receive data packets and selectively distribute the data packet to either the user mode logic or the kernel mode logic, as so determined. In certain implementations, the interface logic includes bridge logic and miniport logic.

In one example, the bridge logic is configured to determine if a received data packet is a user mode data packet or a kernel mode data packet. If the received data packet is a kernel mode data packet, then the bridge logic provides the data packet to the kernel mode logic. If the received data packet is a user mode data packet, then the bridge logic stores the data packet in memory for subsequent retrieval/use by the user mode logic. The bridge logic is further configured to receive outgoing kernel mode data packets from the kernel mode logic and to provide the outgoing data packets to a network communication port. The bridge logic is also configured to retrieve outgoing user mode data packets from the memory and to provide these outgoing data packets to the same network communication port.

In this example, the miniport logic is configured to provide an interface between the memory accessed by the bridge logic and user mode logic. Thus, for example, the miniport logic accepts outgoing user mode data packets and stores them in the memory for subsequent access by the bridge logic, which typically would run in kernel mode. The miniport logic also accesses or otherwise retrieves incoming user mode data packets from the memory after they have been stored there by the bridge logic, and provides these data packets to the user mode logic. Here, the user mode logic would typically run in user mode.

With this exemplary apparatus, both user mode and kernel mode data packets can be sent/received through one communication port. In certain implementations, the communication port may include a network, such as, for example, a TCP/IP network, perhaps including the Internet. Consequently, given such an apparatus and by selectively switching between kernel and user modes, kernel mode logic such as, e.g., debugging logic, may be run on a networked device while the device is also allowed to run user mode logic that also requires a network communication capability. Given such an apparatus, debugging operations can be conducted without significantly interrupting or otherwise interfering with the operation of the device being debugged.

BRIEF DESCRIPTION OF THE DRAWINGS

A more complete understanding of the various methods and apparatuses of the present invention may be had by reference to the following detailed description when taken in conjunction with the accompanying drawings wherein:

FIG. 2 is a block diagram that depicts a general architecture for certain exemplary types of communicating/computing devices.

DETAILED DESCRIPTION

Figure 1:
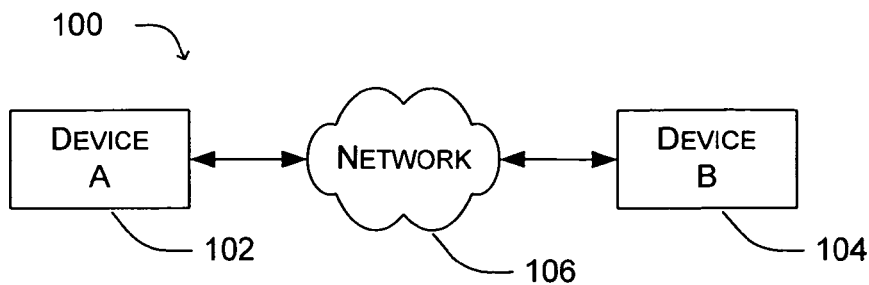
FIG. 1 is a block diagram that depicts an exemplary environment wherein two or more devices are arranged to communicate through at least one network connection, in accordance with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a computer or like device. Generally, program modules include routines, programs, objects, components, data structures, etc. that perform particular tasks or implement particular abstract data types. Those skilled in the art will recognize that the logical functions described herein are suitable for implementation in hardware, firmware and/or software, depending upon the targeted device.

FIG. 1 is a block diagram depicting an exemplary data communication environment 100 having at least two devices that are operatively coupled together through at least one network. Here, for example, device A 102 is connected to device B 104 through network 106.

Devices A 102 and B 104 are representative of any device that is capable of sending and/or receiving data via network 106. Thus, by way of example, device A 102 may include a personal computer (PC), a network appliance, a personal digital assistant (PDA), a web companion, a mobile telephone, and/or other like devices. In certain exemplary implementations, device A 102 includes an embedded network communication capability that allows device A 102 to send/receive transmission control protocol/Internet protocol (TCP/IP) data packets. In this example, device B 104 may take the form of a remote server or like device that is configured to exchange data over network 106 with device A 102.

In certain implementations device B 104 is specifically configured to support debugging processes associated with the operation of device A 102. Such debugging processes would typically require a debugging process operating within device A 102 to receive commands/data from, and provide resulting data to, a corresponding debug controlling process operating within device B 104. One example of this type of debugging operation is that which is conducted by the original equipment manufacturer (OEM) of device A 102. Here, for example, network 106 may include a local area network (LAN) that allows the OEM to debug (e.g., monitor, test, modify, etc.) the operation of device A 102 using device B 104.

As mentioned above in the Background section, to reduce costs/size/complexity, certain devices are manufactured with one network communication port, such as, for example, an IEEE 802.3 (i.e., Ethernet) port. To debug such a device it may be necessary to capture/monitor/measure various parameters within the operating system (OS) kernel while the device is supporting application level communications via the network communication port. Unfortunately, since the application level communications require the use of the only network communication port, the debugging commands/data to/from the OS kernel cannot be transmitted through the network communication port. Hence, OEMs of conventional devices have tended therefore to add or otherwise utilize a typically slower serial or parallel data communication input/output (I/O) port to provide a path for the debugging commands/data between the device being debugged and a supporting/controlling device.

For simplicity, the term "data" as used herein is intended to include any type of data, including command or control data, communication data, raw data, processed data, etc. In certain exemplary implementations the data is provided in the form of one or more data packets. Here, the data packets can be defined as being either kernel mode generated data packets or application level (user mode) generated data packets, based on the generating process or processes and/or intended recipient process/processes.

In accordance with certain aspects of the present invention, methods and apparatuses are provided which allow user mode data and kernel mode data to be transmitted/received through a single, shared or common communication port. Thus, for example, in the exemplary OEM debugging operation described above the kernel mode debugging data can be transmitted/received through the same network communication port being used to transmit/receive user mode data. As such, the communication bandwidth supporting the debugging operation will usually be higher than that associated with a serial or parallel port. Also, in certain implementations device A 102, for example, can be configured without an additional serial or parallel port.

Attention is now drawn to the block diagram depicted in FIG. 2. FIG. 2 illustrates an example of a conventional computing environment 120, of which all or part may be implemented within either device A 102 and device B 104 to support the various methods and apparatuses described herein.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 2, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 2 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 2 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 2, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 2, remote application programs 189 may reside on a memory device of remote computer 182. It will be appreciated that the network connections shown and described are exemplary and other means of establishing a communications link between the devices may be used.

Figure 3:
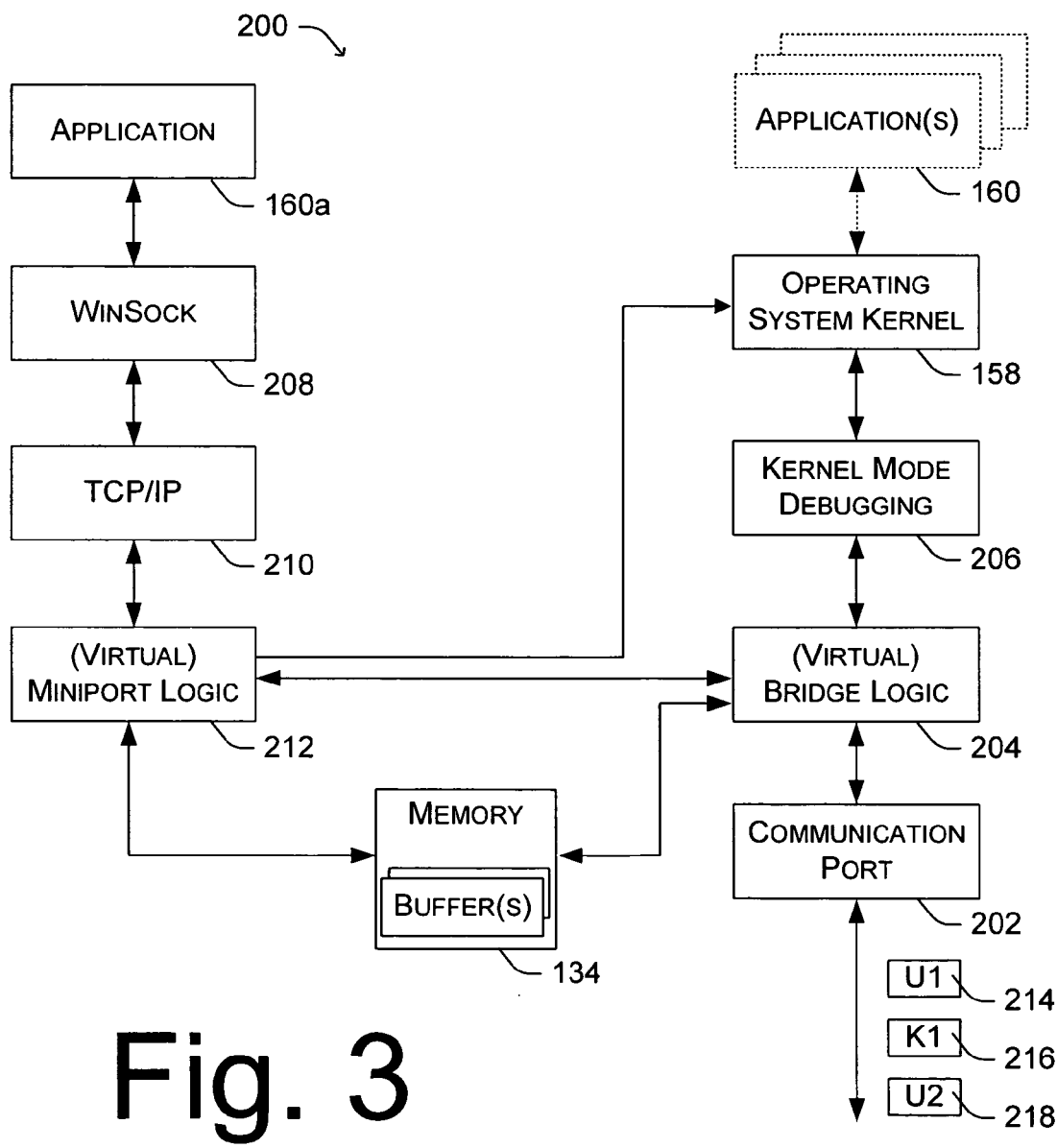
FIG. 3 is a block diagram that depicts an arrangement for sharing a common communication port to send/receive user mode data and kernel mode data, in accordance with certain exemplary implementations of the present invention.

With the various components and functions described above in mind, attention is drawn to the block diagram of an apparatus 200 in FIG. 3, which depicts certain components and functions that may be operatively configured within device A 102 (FIG. 1), in accordance with certain exemplary implementations of the present invention. While this example is directed towards a TCP/IP network, those skilled in the art will recognize that the methods and/or apparatuses taught herein are applicable/adaptable to other data communication protocols/schemes.

As shown, a communication port 202 is configured to send and receive data packets, such as, user mode data packets U1 214 and U2 218, and kernel mode data packet K1 216. A kernel mode process referred to herein as "virtual" bridge logic 204 is operatively configured to provide or otherwise identify outgoing data packets (either user or kernel mode) to communication port 202 and receive or otherwise identify incoming data packets (again, either user or kernel mode) from communication port 202. Bridge logic 204 is configured to provide a multiplexing-like, port-sharing capability that allows user mode data packets to be sent/received through communication port 202 along with kernel mode data packets. Here, bridge logic 204 operates in kernel mode.

To accomplish this port-sharing task, bridge logic 204 is operatively coupled to a kernel mode debugging process 206, for example. Kernel mode debugging process 206, in this exemplary arrangement, is configured to support debugging operations associated with OS kernel 158. Bridge logic 204 is configured to receive data packets from communication port 202 and determine if the received data packets are either user mode or kernel mode data packets. If the received data packet is determined to be a kernel mode data packet, for example, associated with kernel mode debugging process 206, then the received kernel mode data packet is provided to or otherwise identified to kernel mode debugging process 206. In certain implementations, the kernel mode data packet is provided to or identified to kernel mode debugging process 206 without significant delay in order to support time-critical processes within the kernel mode debugging operation.

If bridge logic 204 determines that one or more received data packets are user mode data packets, for example, associated with application 160a, then bridge logic 204 stores or otherwise operatively associates the received data packet(s) within one or more buffers within memory 134. Bridge logic 204 notifies or otherwise identifies to virtual miniport logic 212 that incoming user mode data packets are queued and ready for retrieval. Subsequently, "virtual" miniport logic 212 operating in the user mode retrieves the stored user mode data packet(s) and provides or otherwise identifies the retrieved data packet(s) to application 160a through one or more conventional communication supporting network/transport protocol functions (as applicable), such as, for example, a TCP/IP function 210 and a Windows Sockets (WinSock) function 208.

The above exemplary incoming data packet handling processes are essentially reversed to handle outgoing data packets, based on the type of outgoing data packet. For example, outgoing kernel mode data packets generated by kernel mode debugging process 206 are provided to or otherwise identified to bridge logic 204. Bridge logic 204 then provides or otherwise identifies the outgoing kernel mode data packets to communication port 202, which then proceeds to send the outgoing kernel mode data packet over the network connection. Note, here, communication port 202 is configured to operate in kernel mode.

When application 160a generates outgoing user mode data, for example, then the outgoing user mode data is provided or otherwise identified through, e.g., WinSock function 208 and TCP/IP function 210, to miniport logic 212 in the form of one or more outgoing user mode data packets. Miniport logic 212 stores or otherwise operatively associates each outgoing user mode data packet in one or more buffers within memory 134. Miniport logic 212 notifies or otherwise identifies to OS kernel 158, for example, through a logical event setting or the like, that outgoing user traffic is queued and waiting to be sent through communication port 202. Subsequently, during kernel mode, bridge logic 204 provides or otherwise identifies the queued outgoing user mode data packets to communication port 202, which then sends them over the network connection.

Those skilled in the art will recognize that a plurality of applications 160 may be operatively supported in a similar manner, such that the user mode traffic includes user mode data packets associated with various applications.

Figure 4:
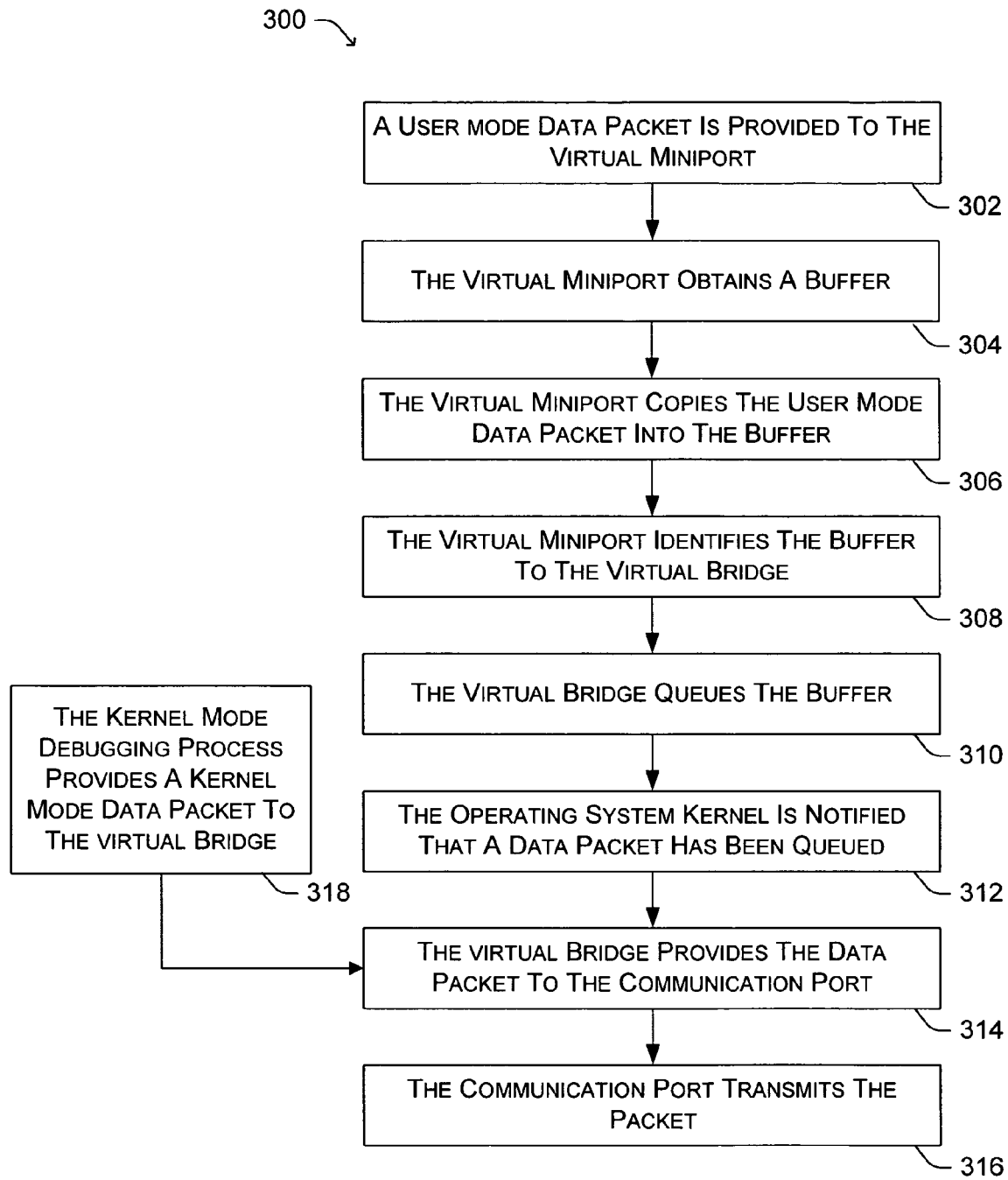
FIG. 4 is a flow diagram that depicts a shared communication port data packet transmission process, in accordance with certain exemplary implementations of the present invention.

With the above arrangements in mind, FIG. 4 is a flow diagram that depicts a shared communication port data packet transmission process 300. In step 302, a user mode data packet (e.g., from an application) is provided to miniport logic 212. In certain implementations of step 302, for example, a network driver interface specification (NDIS) packet is passed into miniport logic 212. In step 304, miniport logic 212 obtains the necessary buffer space in memory 134. Here, for example, miniport logic 212 may be configured to use an I/O control (IOCTRL) command, such as, IOCTRL_VBRIDGE_GET_TX_PACKET, to obtain a kernel buffer from the OS kernel 158. In step 306, miniport logic 212 copies the outgoing user mode data packet to the buffer obtained in step 304. For example, in certain implementations, as part of step 306 miniport logic 212 would copy the WinSock application's data into the applicable kernel buffer.

Next, in step 308, miniport logic 212 identifies the applicable buffer(s) to bridge logic 204. In step 310, bridge logic 204 queues the buffered outgoing user mode data packet for transmission. By way of example, in certain implementations, miniport logic 212 provides an IOCRTL_VBRIDGE_GET_TX_PACKET_COMPLETE command to OS kernel 158, which causes bridge logic 204 to queue the buffered data packet. At this point, miniport logic 212 can then return any associated NDIS packets.

In step 312, the OS kernel 158 is notified that an outgoing user mode data packet has been queued for transmission. In certain implementations, for example, step 312 may include having miniport logic 212 trigger an event that OS kernel 158 recognizes or responds to. Next, in step 314, bridge logic 204 provides the outgoing data packet to communication port 202. In step 316, the outgoing data packet is transmitted by communication port 202 over the network connection. For example, the triggering event may cause a switch to kernel mode, wherein queued user mode data packets are then provided to communication port 202 and transmitted.

When kernel mode debugging process 206 decides to send a kernel mode data packet, then, as in step 318, the outgoing kernel mode data packet is provided to bridge logic 204. Next, in step 314, bridge logic 204 provides the outgoing data packet to communication port 202, which, in step 316, transmits the outgoing data packet over the network connection.

In certain preferred implementations, kernel mode data packets have a higher priority than user mode data packets. Thus, in such implementations kernel mode data packets will be transmitted before any queued user mode data packets are transmitted. Those skilled in the art will recognize that a producer/consumer queuing arrangement or like controllable buffering mechanism may be used to provide the requisite management of the various data packets.

Furthermore, to support time critical debugging processes the transmission of kernel mode data packets is preferably not significantly delayed by bridge logic 204 and/or communication port 202.

Figure 5:
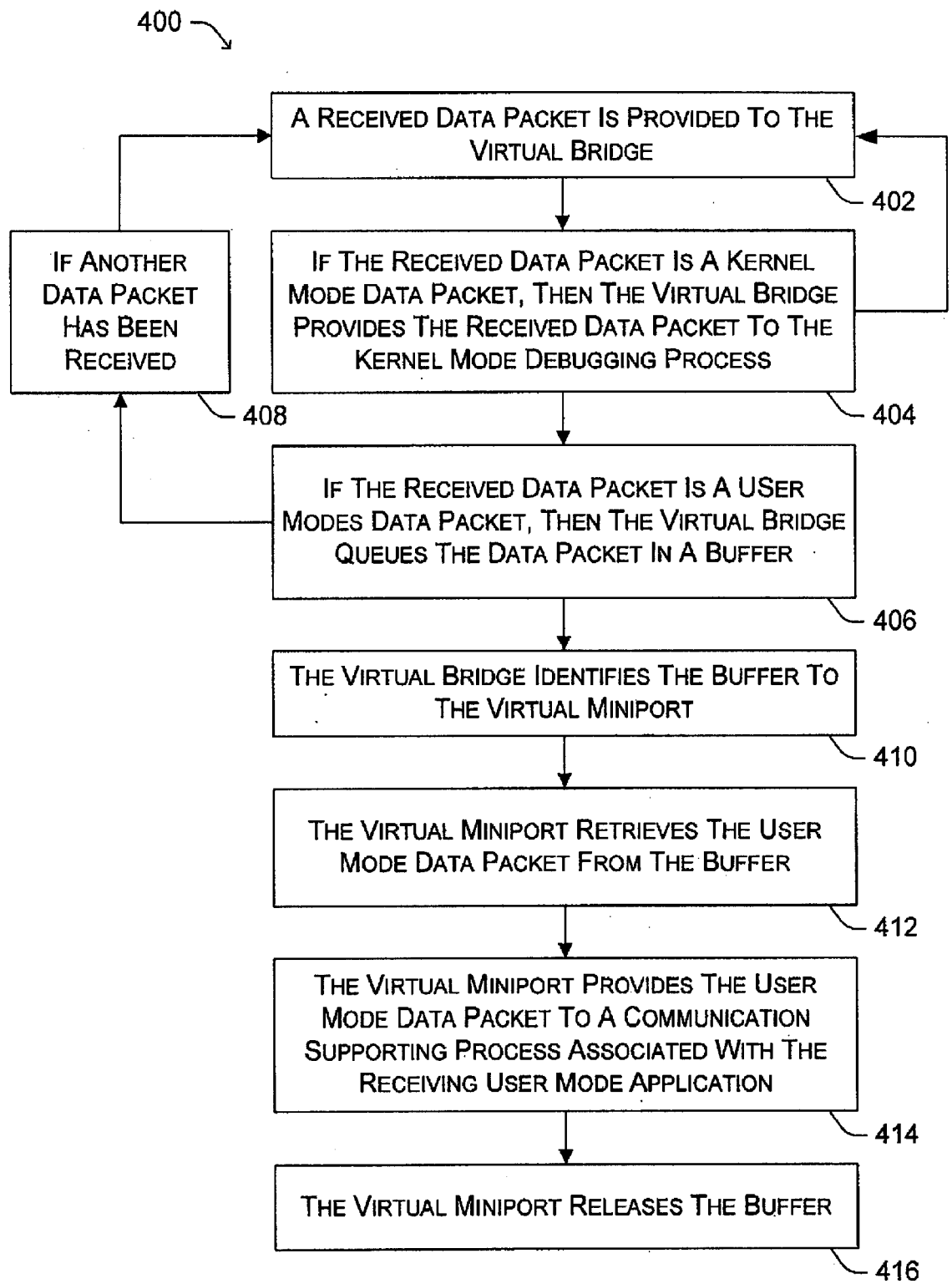
FIG. 5 is a flow diagram that depicts a shared communication port data packet reception process, in accordance with certain exemplary implementations of the present invention.

Attention is now drawn to the flow diagram in FIG. 5, which depicts a shared communication port data packet reception process 400. In step 402, a data packet is received and provided by communication port 202 to bridge logic 204. In certain exemplary implementations, the reception of an incoming data packet causes OS kernel 158 to be interrupted or otherwise notified, such that the incoming data packet is extracted and provided to bridge logic 204.

Bridge logic 204 is configured to identify if the received data packet is a user mode data packet or a kernel mode data packet. Thus, in step 404, if the received data packet is a kernel mode data packet, then bridge logic 204 provides the received data packet to kernel mode debugging process 206. In certain implementations, the received kernel mode data packet is preferably provided to kernel mode debugging process 206 without significant delay since it may be time-critical or otherwise important to an on-going debugging operation. After step 404, process 400 returns to step 402.

If bridge logic 204 determines that the received data packet is, instead, a user mode data packet, then in step 406 bridge logic 204 queues or otherwise stores the user mode data packet in one or more buffers, for example, within memory 134. As represented by step 408, if additional data packets have been received, then process 400 returns to step 402 to repeat steps 402 and either 404 or 406 depending upon the type of data packet received.

Let us assume, for example, that only two data packets were received and that each data packet was determined to be a user mode data packet. Then, in this example, both user mode data packets would be queued in accordance with step 406. At this point, with no other data packets received, bridge logic 204 would identify to miniport logic 212 the buffer(s) used to queue the user mode data packets, as in step 410. In certain implementations, for example, bridge logic 204 triggers an event that identifies that at least one user mode data packet has been queued.

Next, in step 412, miniport logic 212 retrieves the user mode data packet(s) from the buffer(s). For example, in certain exemplary implementations, miniport logic 212 uses IOCTL_VBRIDGE_GET_RX_PACKET to retrieve the data packet(s).

In step 414, miniport logic 212 provides the user mode data packet(s) to one or more communication supporting network/transport protocol functions, such as, for example, TCP/IP function 210 and WinSock function 208. In step 416, miniport logic 212 releases the buffer(s). Thus, for example, in certain implementations as part of step 416 miniport logic 212 completes an indication to NDIS with regard to the user mode data packet(s) and calls IOCTL_VBRIDGE_GET_RX_PACKET_COMPLETE to return the buffer(s) back to bridge logic 204.

In certain implementations, for example, bridge logic 204 is provided in the form of a library (Vbridge.lib) that an OEM links to the hardware adaptation layer (HAL) module. Miniport logic 212 is provided in the form of a dynamic linked library (DLL) (Vmini.dll), which performs as a pass through miniport driver. Vmini.dll runs in user mode (pre-emptable) and Vbridge.lib functions are called in kernel mode (not preemptable). The two modules can communicate via a KernelIOControl() code exported by OS kernel 158, for example, named system interrupt (SYSINTR_VMINI). Here, memory 134 can be reserved by Vbridge.lib. In this exemplary implementation, Vmini.dll is configured to follow standard NDIS miniport implementation techniques.

With the above example in mind, the following is an exemplary listing of various IOCTRL codes and associated functional descriptions that Vmini.dll uses to communicate to the IOCTRL handling provided within OS kernel 158:

1. IOCTRL_VBRIDGE_GET_TX_PACKET—this function is used by Vmini.dll to obtain a kernel buffer to be filled with outgoing user mode data.
2. IOCTRL_VBRIDGE_GET_TX_PACKET_COMPLETE—when the buffer is properly filled, Vmini.dll uses this function to trigger the kernel's code to start sending out user mode data packets.
3. IOCTRL_VBRIDGE_GET_RX_PACKET—when Vmini.dll is notified (e.g., via a named event) that a user mode packet is available, Vmini.dll uses this function to obtain access to the kernel buffer.
4. IOCTRL_VBRIDGE_GET_RX_PACKET_COMPLETE—this function is used by Vmini.dll to return the buffer obtained in IOCTRL_VBRIDGE_GET_RX_PACKET; when returned, kernel 158 can then use the buffer for future incoming data packets.
5. IOCTRL_VBRIDGE_GET_ETHERNET_MAC—since Vmini.dll and kernel 158 share the same physical Ethernet port, this function allows Vmini.dll to obtain the medium access controller (MAC) address of the Ethernet adapter.
6. IOCTRL_VBRIDGE_CURRENT_PACKET_FILTER—this function allows Vmini.dll to selectively specify the filter that is to be used by the underlying Ethernet hardware while receiving incoming data packets.
7. IOCTRL_VBRIDGE_802_3_MULTICAST_LIST—this function allows Vmini.dll to pass in multicast address lists that WinSock application 160a, for example, wants to listen to.
8. IOCTRL_VBRIDGE_SHARED_ETHERNET—this function allows Vmini.dll to determine whether the particular kernel it is running can support the shared communication port methods and apparatuses, for example, as provided herein.

Based on the foregoing descriptions, it can be seen that devices, such as device A 102 (FIG. 1) can be configured through the addition of "virtual" miniport logic 212 and "virtual" bridge logic 204 to support both kernel mode data packets and user mode data packets through a common shared communications port 202. This allows, for example, kernel mode debugging operations to be conducted while one or more applications are running. Such debugging may take place during manufacture, for example, by the OEM. Moreover, such debugging may also take place remotely, for example, over a LAN, WAN, the Internet, an intranet, or the like.

Although some preferred embodiments of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
providing at least one processing unit to selectively run user mode logic and kernel mode logic, wherein said user mode logic includes network protocol logic and application level logic;
receiving at least one data packet though a shared communication port; and
while said processing unit is running said kernel mode logic, selectively handling said data packet for use with either said user mode logic or said kernel mode logic.

2. A computer readable media having computer instructions for performing acts comprising:
selectively running at least one processing unit using either user mode logic or kernel mode logic, wherein said user mode logic includes network protocol logic and application level logic;
receiving at least one data packet though a shared communication port; and while running said kernel mode logic, selectively handling said data packet for use with either said user mode logic or said kernel mode logic.

3. A computer readable media having computer instructions for performing acts comprising:
  selectively running at least one processing unit using either user mode logic or kernel mode logic;
  receiving at least one data packet through a shared communication port, wherein said shared communication port includes a physical network communication port operatively configurable to receive both user mode data packets and kernel mode data packets from an external device; and
  while running said kernel mode logic, selectively handling said data packet for use with either said user mode logic or said kernel mode logic.

* * * * *